No. 867,931. PATENTED OCT. 8, 1907.
F. L. O. WADSWORTH.
MANUFACTURE OF GLASS HAVING SURFACE PROJECTIONS.
APPLICATION FILED MAY 20, 1904.
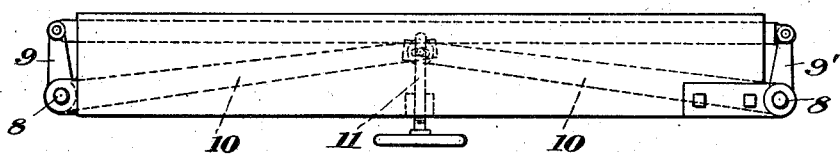
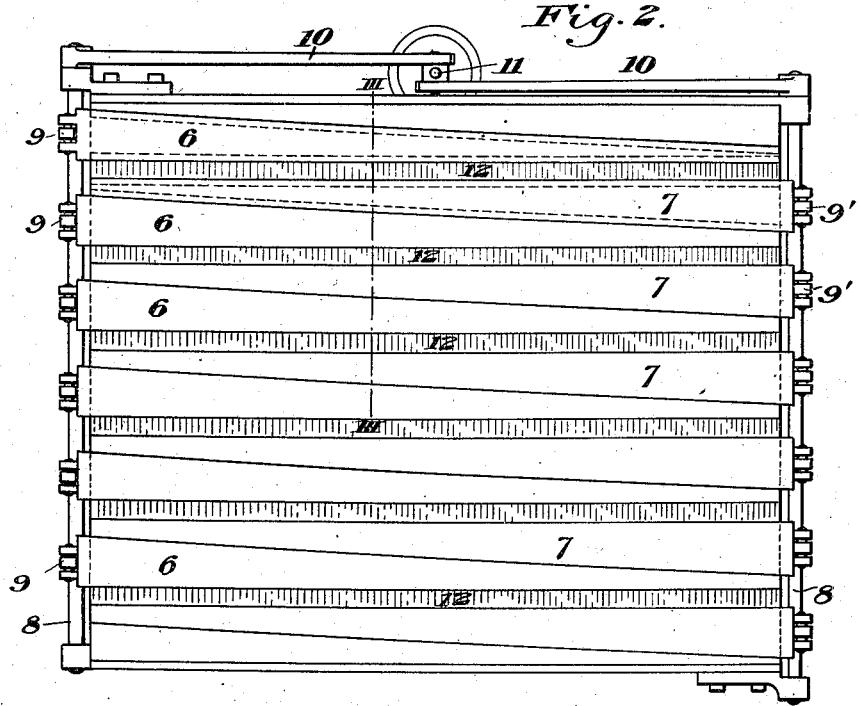
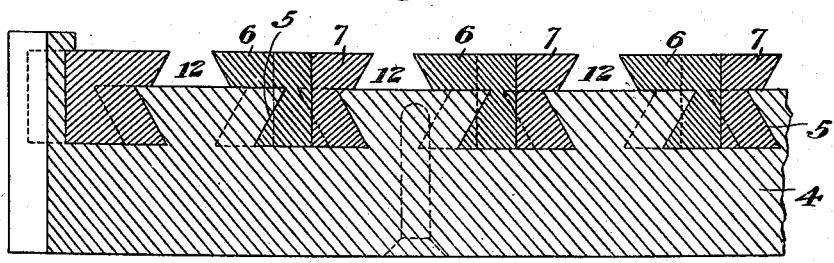
WITNESSES
INVENTOR

UNITED STATES PATENT OFFICE.

FRANK L. O. WADSWORTH, OF MORGANTOWN, WEST VIRGINIA, ASSIGNOR TO PRESSED PRISM PLATE GLASS COMPANY, OF NEW YORK, N. Y., A CORPORATION OF WEST VIRGINIA.

MANUFACTURE OF GLASS HAVING SURFACE PROJECTIONS.

No. 867,931.          Specification of Letters Patent.          Patented Oct. 8, 1907.

Application filed May 20, 1904. Serial No. 208,910.

*To all whom it may concern:*

Be it known that I, FRANK L. O. WADSWORTH, of Morgantown, Monongalia county, West Virginia, have invented a new and useful Improvement in the Manufacture of Glass Having Surface Projections, of which the following is a full, clear, and exact description, reference being had to the accompanying drawings, forming part of this specification, in which—

Figure 1 is an end view of a table suitable for the practice of my invention; Fig. 2 is a plan view; Fig. 3 is a vertical section on the line III—III of Fig. 2; Fig. 4 is a sectional view illustrating a sheet of glass made with the apparatus shown in the other figures.

The purpose of my invention is to provide for the manufacture of glass sheets, blocks, or other articles having surface projections, such as keys for holding tiles or slabs to a bed of cement on the surface of a wall, or for forming prism projections or the like on glass sheets. I will describe it with reference to the manufacture of a glass plate or slab, 2, such as shown in Fig. 4, having surface-keys 3 of dovetail shape designed to afford a bond to attach the glass to a cement wall. I employ a table having surface grooves, and when the glass has been cast or rolled upon the table and portions of it have entered the grooves, the sides of the grooves are brought together upon the glass therein so as to compress and shape it as desired.

The preferred form of apparatus with which my invention is carried into effect is shown in the drawing, in which the table is constituted by a bed-plate 4 having on its surface a series of grooves 5, 5 with inclined sides constituting ways in which slide oppositely movable strips 6, 7, the surfaces of which constitute the rolling surface on which the glass sheet is formed, and the spaces between the adjacent strips 6, 6 constitute the grooves in which the projections on the glass are shaped.

The strips 6, 7 are of wedge-shape as shown in Figs. 2 and 3, so that when the members of the adjacent pairs of strips are moved in opposite directions, they will widen or narrow the intermediate groove-spaces. For this purpose I provide a rock-shaft 8 at each end of the table and connect rock-arms 9 thereon with each alternate strip, the strips 6 being connected with rock-arms 9 at one end of the table and the strips 7 being connected with rock-arms 9′ at the other end.

The rock-shafts 8 are connected by levers 10 with a vertically movable screw-shaft or similar device 11, and by moving it in one direction (upwardly as shown in Fig. 1) the ends of the strips 6 and 7 will be drawn outwardly from the table in opposite directions, and by moving the shaft in the other direction (downwardly as shown in Fig. 1) the strips will be moved inwardly in opposite directions toward the middle of the table. The outward motion will widen the intervening grooves or spaces 12 and the inward motion will contract them.

In the use of this apparatus a body of glass is placed upon the surface of the strips 6 and 7 and is rolled or otherwise distributed thereover into a sheet or slab, and portions of the glass will enter the grooves 12, but owing to the dovetail shape of these grooves the glass does not perfectly fill the same. Then by means of the mechanism above described the strips are moved inwardly so as to contract the grooves 12 and to press the strips laterally against the glass therein, thus shaping and molding it to the desired dovetail contour. The strips are then retracted so as to widen the grooves 12 and to free the dovetail projections of the glass from holding engagement with the strips, whereupon the glass may readily be removed from the table. The pressure applied to the glass by contracting the walls of the grooves is applied otherwise than through the body of the glass.

It will be seen that the strips 6 and 7 are so arranged that their movement does not change the form of the table surface, but simply changes the width of the grooves 12; also that no matter what their position, the only opening in the table surface is that made by these grooves. In these respects my method is believed to differ essentially from all prior methods, in which the movable portions of the forming surface have been so arranged that their movement changes the form of the table surface. This leaves openings in such surface other than the intentional ones, into which the glass or other material can enter when placed upon the forming surface, and produces irregularities of such surface, if it does not prevent the operation of the apparatus.

A further distinctive feature of my method consists in the fact that the motion of the movable strips is in a direction parallel to the ribs or projections, thereby giving a sliding formative action which is of great advantage. My method also avoids placing undue strains upon the glass. In some cases it will not be necessary to employ the first motion of the strips by which the grooves are narrowed and the intermediate portions of the glass pressed, and it will suffice merely to retract the strips to widen the spaces and free the glass.

Within the scope of my invention the form of the apparatus and the mechanism by which the grooves are varied in width may be changed, since

What I claim is:

1. The herein described method of making glass having surface projections which consists in distributing the glass on a grooved surface in sheet form with portions thereof in the grooves of the surface, and then moving the walls of the grooves relatively in a direction both lateral and endwise to cause them to exert a sliding formative and compressive action upon the glass; substantially as described.

2. The herein described method of making glass having surface projections which consists in rolling a sheet or slab of glass upon a grooved surface, and then moving the walls of the grooves both endwise and laterally to exert a compressive formative action upon the glass in the grooves; substantially as described.

3. The herein described method of making glass having surface projections, which consists in distributing the glass on a grooved surface with portions thereof in the grooves of the surface, then moving the groove-walls in a direction both lateral and endwise to cause them to exert a sliding formative and compressive action upon the glass in the grooves, and then spreading the walls to release the glass; substantially as described.

4. The herein described method of making glass having surface projections, which consists in distributing the glass on a grooved surface with portions thereof in the grooves, and then compressing and shaping the glass in the grooves by moving the grooved walls both laterally and endwise while maintaining their parallelism; substantially as described.

In testimony whereof, I have hereunto set my hand.

FRANK L. O. WADSWORTH.

Witnesses:
THOMAS W. BAKEWELL,
GEO. B. BLEMING.